Feb. 2, 1943.   W R. KING   2,309,848
DIFFERENTIAL PRESSURE LOADED CONTROL VALVE
Filed June 5, 1937   2 Sheets-Sheet 1

Inventor
W. R. KING.
Jesse R. Stone
Lester B. Clark
Attorneys.

Patented Feb. 2, 1943

2,309,848

UNITED STATES PATENT OFFICE 2,309,848

DIFFERENTIAL PRESSURE LOADED CONTROL VALVE

William R. King, Mineola, Tex.

Application June 5, 1937, Serial No. 146,558

10 Claims. (Cl. 50—16)

The invention relates to a pilot loaded control valve wherein the pilot is controlled by the downstream pressure of the control valve.

In the control of fluid pressure in pipe lines, for instance, such as gas transmission lines, it is necessary to provide a control valve at a point in the line which is sometimes quite distant from the point of consumption. In view of the fact that the consumption is more or less fluctuating and it is desirable to maintain a substantially constant pressure at the point of consumption, it is necessary that the control valve be quite accurately operated as a function of the rate of flow of the gas. It must be borne in mind, however, that there is a certain drop in pressure between the control valve and the point of consumption due to friction loss in the line depending upon the length and diameter of the pipe line and the density and pressure of the gas or other fluid, so that the valve can not operate wholly upon variation in pressure due to the rate of flow but must compensate also for the drop in pressure due to this friction loss and at the same time prevent building up of excessive pressure when the rate of consumption is reduced and there is a proportionate decrease in the friction loss.

It is, therefore, one of the objects of the invention to provide a valve with mechanism for operating the same in combination with a means to load the valve, which loading means is in turn operated in part as a function of the rate of flow of fluid.

Another object of the invention is to provide a pilot loading valve for fluid pressure line control valves wherein the pilot is controlled in accordance with the variation in the downstream pressure of the main valve.

Another object of the invention is to regulate the operation of a main valve by means of a pilot valve loaded in accordance with predetermined constant pressure which is supplemented by the variation of pressure due to the rate of flow of the fluid and which pilot valve is in turn controlled by the variation in the downstream pressure.

Another object of the invention is to provide a loading valve for control valves, which loading valve is in turn loaded from two sources, one of which operates as a function of the flow of fluid.

Other and further objects of the invention will be readily apparent when the following description is considered in connection with the accompanying drawings wherein.

Figure 1:
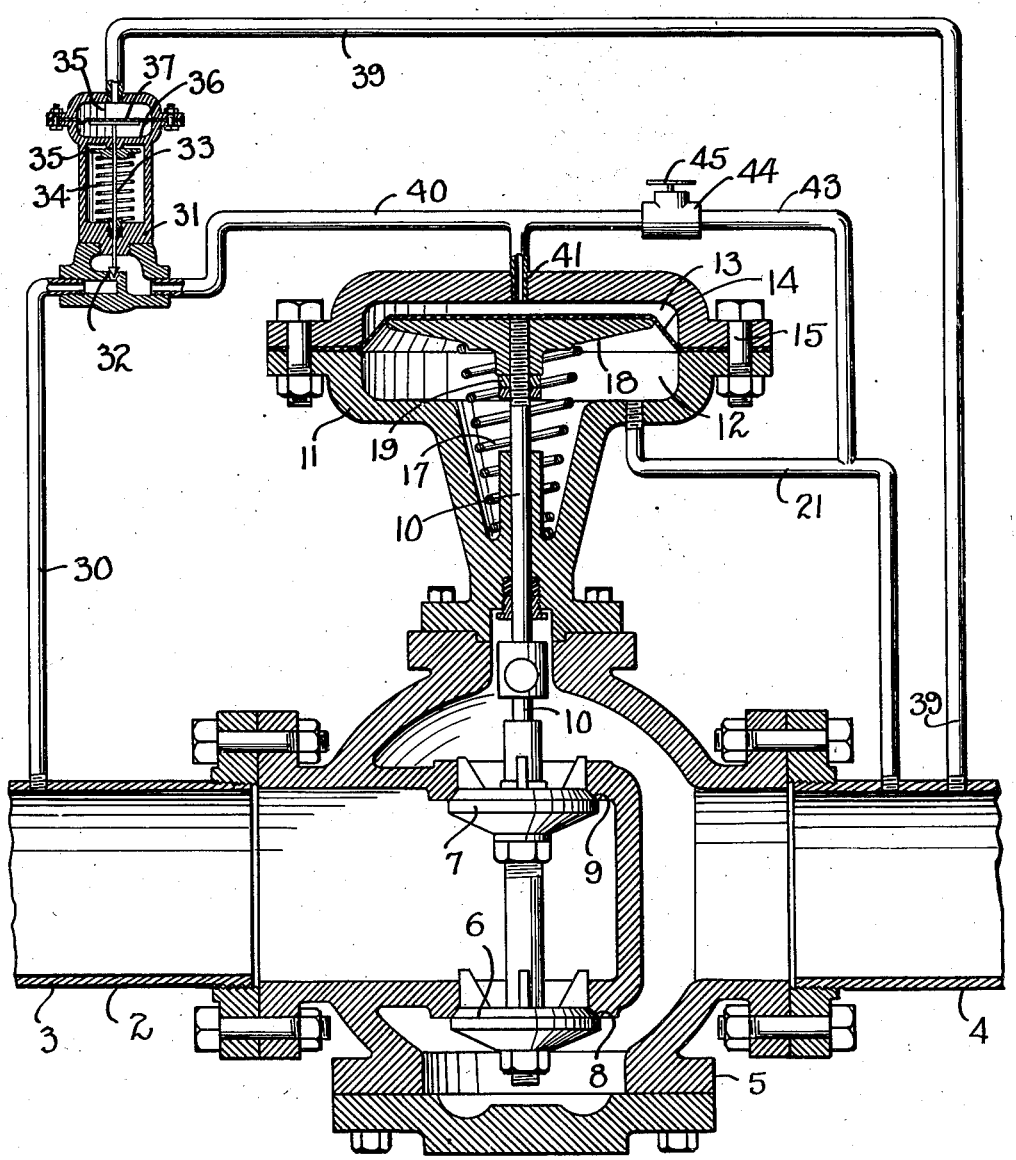
Fig. 1 is a vertical sectional view through a main valve which is operated in accordance with the invention by a pilot valve which is in turn controlled by the downstream pressure of the main valve.
Figure 2:
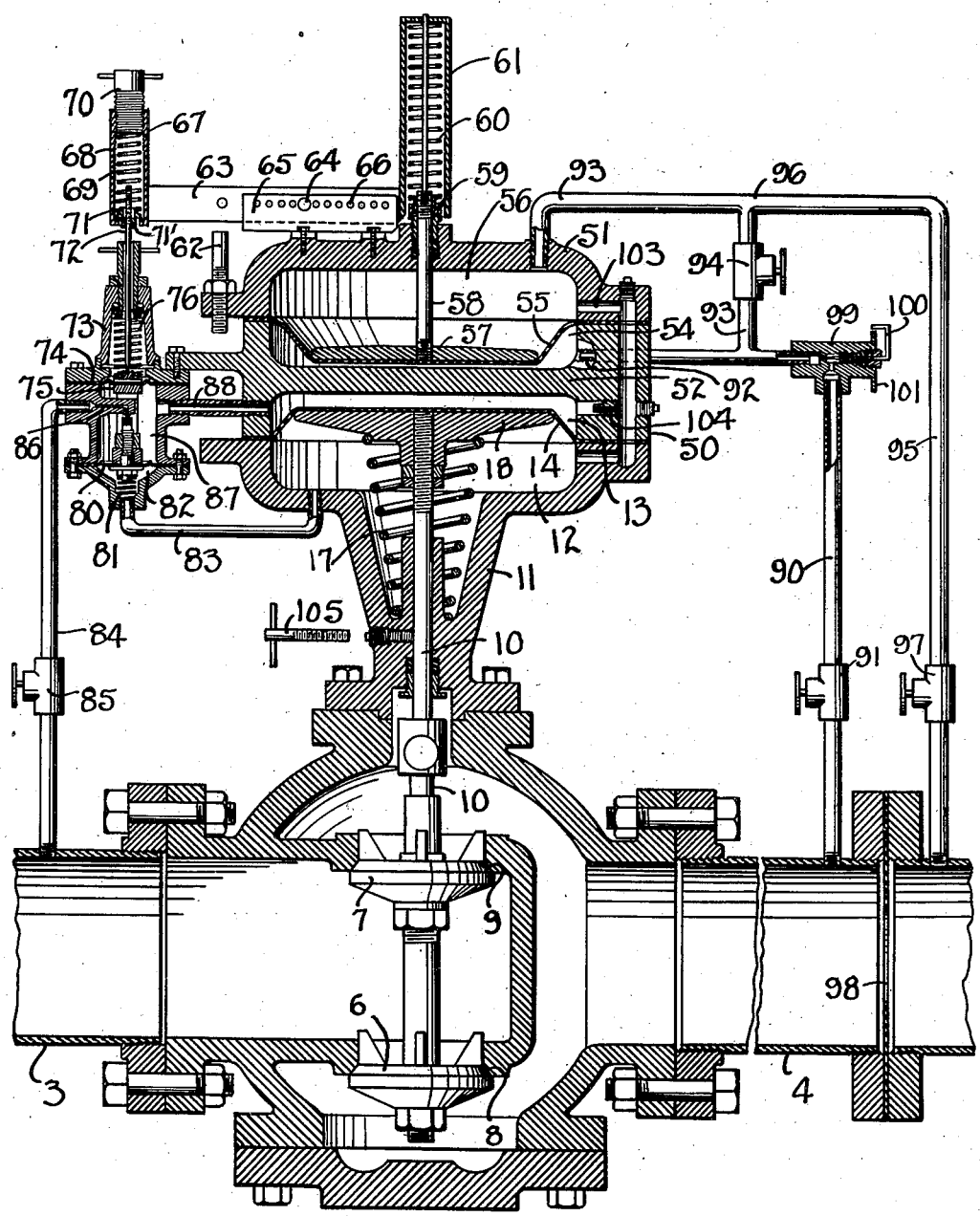
Fig. 2 is a vertical sectional view of another form of the invention wherein a pilot loading valve is provided, which valve is controlled in accordance with the fluctuation of the downstream pressure and is loaded in accordance with a drop across an orifice plate.

The Fig. 1 form of the invention relates to the general subject matter of my prior copending application Serial No. 735,589, filed July 17, 1934, for a Regulator valve, while Fig. 2 relates to the same general subject matter as that disclosed in my prior copending application Serial No. 89,004, filed July 6, 1936, for a Regulator valve which has matured into Patent No. 2,182,873, granted December 12, 1939.

There are two applications of the invention illustrated. Fig. 1 shows it applied to a constant pressure regulator and Fig. 2 shows it applied to a type of regulator which operates in part due to a fluctuation of the flow of fluid.

In Fig. 1 a pipe line is indicated generally at 2, the high pressure side 3 and the low pressure side 4 being joined by a main valve structure 5. The valve members 6 and 7 have been provided to close the openings 8 and 9, respectively, where the fluid passes through the main valve. It will be noted that the valve members 6 and 7 are upwardly closing valve members and movement is imparted to them by the valve stem 10.

In order to control the movement of the valve stem 10 a bonnet or housing 11 has been provided, which is separated into the lower chamber 12 and upper chamber 13 by means of a diaphragm 14. This diaphragm is suitably held in place by the connecting bolts 15 which clamp the top and bottom of the bonnet together.

Disposed inside of the chamber 12 is a coil spring 17 which presses against the plate 18 and normally tends to raise the diaphragm 14 as best seen in Fig. 1. The adjusting nuts 19 may be moved along the stem 10 in order to vary the pressure which is applied to the diaphragm 14. The pressure of this spring 17 normally tends to hold the valves in closed position and prevent any flow from the high pressure to the low pressure side of the valve.

In order to equalize the pressure in the chamber 12 on the low pressure side of the valve an equalizing pipe 21 connects to the low pressure pipe 4 and into the bonnet 11 so that the pressure in the chamber 12 will vary in accordance with the fluctuation of pressure on the low pressure side of the valve and there will never be any excessive pressure trapped beneath the diaphragm 14 which would interfere with its operation. In other words, the diaphragm is floating with a pressure beneath it which varies to a predetermined extent with the variation in the down-stream pressure.

In order to effect operation of the valve and to provide power by which it may be opened, a high pressure take-off line 30 connects to the high pressure pipe 3 and leads into a pilot or loading valve 31. The valve member is indicated at 32 and is controlled by a valve stem 33 which is normally urged to open position by the constant pressure of a spring 34 bearing against a plate 35 which is fixed on the stem 33.

The stem 33 projects through a partition 36 and bears against the diaphragm 37, which is free to move within a chamber 38 except for the pressure which is applied thereto through the conduit 39. This conduit in turn connects to the low pressure pipe 4 the same as the conduit 21. It will be observed that any increase in pressure in the low pressure pipe 4 tends to increase the pressure in the chamber 12 and close the main valve and also tends to increase the pressure in the chamber 35 and close the pilot valve. On the other hand, any reduction in pressure on the downstream side of the valve reduces both of these pressures and allows the high pressure to flow through the pilot valve 31 and into the conduit 40. This conduit is in turn connected at 41 so that it leads into the chamber 13 above the diaphragm 14 and any variation in pressure serves to control the movement of the main valve. An increase in pressure tends to open the valve and a decrease in pressure allows the spring 17 to act against the diaphragm and move it to closed position.

In order that there will be no build-up of pressure in the chamber 13 from its loading valve a bypass line 43 has been provided which is controlled by a choke 44 and connects to the pipe 21 so that it may bleed back into the downstream side of the main valve. The choke 44 is adjustable by means of the handle 45. With this arrangement it seems clear that when there is a reduction in pressure on the downstream side of the pipe line there will be a corresponding reduction in the tendency of the main valve to remain closed and a corresponding tendency for the pilot valve to open and increase the pressure, tending to open the main valve. When the main valve opens and the downstream pressure increases, however, then the tendency of the main valve to close is increased and the tendency of the pilot valve to close is also increased. After the pilot valve closes, the increase in pressure which has been applied to the main valve tending to open it gradually bleeds out of the chamber 13 through the choke 44 so that the main valve will gradually close. By this construction a valve which will operate with the least amount of variation in the downstream pressure has been provided due to the control of the pilot valve as a function of the fluctuation in pressure on the downstream side of the valve. In other words the pilot controls the flow of power for operation of the main valve and the control of the pilot valve is effected through the variation in the downstream pressure so that the entire mechanism is very sensitive and the variation in downstream pressure can be very slight because it is used to control the power instead of being applied solely to the operation of the main valve.

Fig. 2 shows another form of the invention where the pipe line, the low and high pressure pipes, as well as the valve construction, and the stem and operating diaphragm, are the same as those described in connection with Fig. 1. The cap of the bonnet 11, however, has been removed and an additional body 50 has been disposed thereon with the cap 51 positioned on top of this body 50. The body 50 carries an intermediate partition 52, which cooperates with the diaphragm 14 to form the chamber 13, as previously described. The chamber 12 is the same as in Fig. 1. Above the partition 52 a chamber 54 is provided below the pilot loading diaphragm 55. The cap 51 with the diaphragm 55 then forms the top chamber 56.

The diaphragm 55 serves to move the plate 57, which is affixed to the stem 58. The stem 58 projects through the cap 51 and has affixed thereto an adjustable seat ring 59 upon which the spring 60 abuts. This spring serves to allow a predetermined amount of movement of the diaphragm 55 before there is any movement imparted to the sleeve 61 against which the upper end of the spring is disposed.

It will be noted that the chambers 54 and 56 are of substantial size so that they serve with the choke 99 as surge chambers to delay the action of applying the variation in the differential pressure across the orifice plate 98. This operation prevents the pilot valve from reloading or reunloading itself and effects a lag in the opening and closing of the main valve.

Affixed to the sleeve 61 is a lever arm 63 which is pivoted at 64 in the bracket 65. A plurality of openings 66 in the bracket permit adjustment of the fulcrum point for this lever 63. A stop 62 is provided for the lever.

Another somewhat similar device 67 is affixed to the other end of the lever 63 and includes the housing 68 which confines a spring 69. This spring abuts against an adjustable plug 70 in the top of the sleeve and against a washer or ring 71 in the lower end of the housing, which rides on the nuts 71'. In this manner the amount of force which can be applied to the stem 72 which supports the washer 71 is limited by the tension on the spring 69 and the position of the stop post 62. The stem 72 is the stem of the pressure reducer valve 73, which is the same as the valve 31 in Fig. 1.

The reducer valve 73 of Fig. 2 is of special construction in order to avoid friction losses and inaccuracy of operation due to friction. This is accomplished by having the diaphragms 74 and 80 mounted in the valve 73 so that they support a bridge type valve member 75. Movement of this valve member 75 flexes the diaphragms 74 and 80 and avoids the provision of a packer or stuffing box about the stem 72. The spring 76 normally urges the valve member downwardly or to open position.

A coil spring 81 beneath this diaphragm 80 normally tends to support the weight of the diaphragms. A chamber 82 beneath the diaphragm 80, however, is connected with a fluid pressure conduit 83, so that the pressure may be introduced below the diaphragm to effect the control of the valve 75.

While pressure from the high pressure line 3 is introduced into the valve 73 by means of the pipe 84, which is controlled by a valve 85, downward movement of the valve member 75 opens the inlet passage 86 of this valve 73 and allows high pressure to be introduced into the valve chamber 87. A connection 88 leads into the valve chamber 13 above the operating diaphragm 14 so that opening of this valve 73 introduces pressure above the diaphragm 14, which tends to open the main valves 6 and 7.

In order to admit the control pressure to the diaphragm 80 in accordance with the pressure on the under side of the diaphragms 14 the conduit 83 is connected into the chamber 12 beneath the diaphragm 14. Thus the pressure from the low pressure pipe 4 is available through the pipes 95 and 93, chamber 56, passages 103, chamber 12 and pipe 83, under the diaphragm 80. It will be seen that the high pressure is confirmed by the diaphragms 74 and 80 so that it will be balanced on one diaphragm against the other and will thus have no effect whatever upon the operation of the valve 73. This arrangement also avoids the use of stuffing boxes or metallic guides for the parts.

In order that the entire mechanism will operate in accordance with the variation in the rate of flow, and the downstream pressure beyond the main valves 6 and 7 the pressure on the various diaphragms will be equalized and used as a source of power for operating the device. To this end the pipe 90 is connected to the low pressure line 4 and is controlled by a valve 91. This pipe 90 leads to the pipe 92 so that pressure is introduced into the chamber 54. A branch 93 from the pipe 92 leads into the top chamber 56, this passage being controlled by a valve 94. A second conduit 95 also leads from the low pressure line 7 and joins the pipe 93 at the point 96. The valve 97 controls this line as well. These valves 85, 91, 94 and 97 are merely used, however, when the mechanism is to be placed in or out of service.

It will be noted that there is an orifice plate 98 in the pipe 4 between the pipes 90 and 95 so that the pressure in these pipes will be the differential pressure across the orifice plate due to the rate of flow of the gas or fluid. In order to make this differential pressure further adjustable a needle valve or choke has been provided in the pipe 90, this choke being adjustable by the handle 100, and the indicator plate 101 is arranged to indicate the adjustment of this needle valve.

The differential pressure across the plate 98 may be applied to the different diaphragms by arrangement of passages 103 provided in the cap 51, the body 50, and the bonnet 11. This passage leads directly from the chamber 56 and directly into the chamber 12 so that the pressure in these two chambers will be the same. A choke 104, however, is provided into the chamber 13, so as to delay any variation in pressure in this chamber. This is desirable because the high pressure line 88 leads directly into this chamber 13. An adjustable handle 105 is provided on the bonnet 11 in order to control the movement of the stem 10 or to introduce lubricant about the stem 10 or to introduce lubricant about the stem as desired.

Broadly the invention contemplates the use of the power due to the differential pressure of the gas in the line, caused by the rate of flow for the purpose of loading the pilot valve and the control of such pilot valve by the variation in the downstream pressure of the main valve. It is also contemplated that the application of the variation in pressure due to fluctuation in the rate of flow may be so manipulated that the control of the power therefrom can be delayed so as to obtain a practical and satisfactory operation of the mechanism.

What is claimed is:

1. The combination of a main valve, fluid pressure means to operate said valve, a pilot loading valve for said means, and additional means to control said pilot loading valve in accordance with the variation of the downstream pressure of said main valve, and loading means for said pilot valve operable as a function of the volume of fluid flow through the main valve.

2. A power attachment comprising a housing, a diaphragm therein, a stem on said diaphragm projecting from said housing, a spring about said stem and supported thereby, lever means supported on said spring, a pivot for said means, a second spring supporting the other end of said lever means, a member movable by said second spring as variation in pressure in said housing moves said diaphragm, said springs allowing a predetermined movement of said diaphragm before movement is imparted to said member so as to obtain a lag in the movement of said member relative to the movement of said diaphragm, and a regulator valve supported between two spaced diaphragms to be actuated by said member.

3. A flow line for gaseous fluids, a main valve therein, a diaphragm to operate said valve, an orifice plate on the low side of said valve, a source of fluid power to operate said diaphragm, valve means to admit said fluid power to said diaphragm, and means to control said valve means as a function of both the volume of flow through said orifice plate and of said downstream pressure beyond the main valve.

4. A pilot valve of the character described comprising a housing, a pair of spaced diaphragms therein to form a closed chamber and avoid friction losses upon movement of said diaphragms, a valve member connecting said diaphragms, spring means to apply a constant load to said diaphragms tending to open said valve, additional spring means movable to augment said first spring, and means to apply fluid pressure to said diaphragms tending to close said valve in opposition to said springs.

5. A pilot valve of the character described comprising a housing, a pair of spaced diaphragms therein to form a closed chamber and avoid friction losses upon movement of said diaphragms, a valve member carried thereby, spring means to apply a constant load to said diaphragms tending to open said valve, additional spring means movable to augment said first spring, means to apply fluid pressure to said diaphragms tending to close said valve in opposition to said springs, and means to actuate said additional spring means as a function of the volume of flow of fluid being controlled by said pilot valve.

6. A pilot valve for main valves of the character described comprising a housing, a pair of spaced diaphragms therein, a valve member connecting said diaphragms, spring means to apply a constant load to said diaphragms tending to open said valve, additional spring means movable to augment said first spring, means to apply fluid pressure to said diaphragms tending to close said valve in opposition to said springs, and means to vary the opposing fluid pressure applied as a function of the pressure on the low pressure side of said main valve.

7. A pilot valve for main valves of the character described comprising a housing, a pair of spaced diaphragms therein, a valve member carried thereby, spring means to apply a constant load to said diaphragms tending to open said valve, additional spring means movable to augment said first spring, means to apply fluid pressure to said diaphragms tending to close said valve in opposition to said springs, means to actuate said additional spring means as a function of the volume of flow of fluid being controlled by said pilot valve, and means to vary the opposing fluid pressure applied as a function of the pressure on the low pressure side of said main valve.

8. A valve construction and control therefor including a valve member, a valve stem, a diaphragm to move said stem, a housing about said diaphragm, means to introduce a pressure fluid into said housing against said diaphragm to open said valve, means for such pressure fluid to gradually leak from said housing, means to apply the down stream pressure to said housing on the other side of said diaphragm, and additional means to resist the entrance of the pressure fluid by applying the downstream pressure to said first means, and still additional means to supplement the loading of said first means in accordance with the volume of flow through said main valve.

9. A valve construction and control therefor including a valve member, a valve stem, a diaphragm to move said stem, a housing about said diaphragm, means to introduce a pressure fluid into said housing against said diaphragm to open said valve, means for such pressure fluid to gradually leak from said housing, means to apply the down stream pressure to said housing on the other side of said diaphragm, and additional means to resist the entrance of the pressure fluid by applying the downstream pressure to said first means, said first means including a pilot valve member disposed between a pair of spaced diaphragms.

10. A diaphragm operated main valve, a pilot valve to operate said diaphragm, means to connect said pilot valve to the downstream side of the main valve to effect the operation of said pilot valve; means to load said pilot valve to maintain a minimum pressure on the downstream side of said main valve, and additional means to load said pilot valve in accordance with the volume of flow through said main valve, and means to adjust the ratio of application of the force of said latter means.

WILLIAM R. KING.